(12) United States Patent
Kent et al.

(10) Patent No.: US 9,026,130 B2
(45) Date of Patent: May 5, 2015

(54) METHOD AND SYSTEM FOR REGISTERING FEMTOCELLS TO PROVIDE SERVICE

(75) Inventors: Mark Kent, Vista, CA (US); Charles Abraham, Los Gatos, CA (US); Xuemin Chen, San Diego, CA (US); Wael William Diab, San Francisco, CA (US); Vinko Erceg, Cardiff, CA (US); Victor Hou, LaJolla, CA (US); Jeyhan Karaoguz, Irvine, CA (US)

(73) Assignee: Broadcom Corporation, Irvine, CA (US)

(*) Notice: Subject to any disclaimer, the term of this patent is extended or adjusted under 35 U.S.C. 154(b) by 1342 days.

(21) Appl. No.: 12/355,064

(22) Filed: Jan. 16, 2009

(65) Prior Publication Data
US 2010/0184431 A1 Jul. 22, 2010

(51) Int. Cl.
*H04W 24/00* (2009.01)
*H04W 48/20* (2009.01)
*H04W 4/02* (2009.01)
*H04W 84/04* (2009.01)

(52) U.S. Cl.
CPC ............... *H04W 48/20* (2013.01); *H04W 4/02* (2013.01); *H04W 84/045* (2013.01)

(58) Field of Classification Search
USPC ........... 455/435.1, 440, 445, 561, 446, 422.1, 455/452.1, 444, 410, 418, 406; 370/241.1, 370/338, 329, 328
See application file for complete search history.

(56) References Cited

U.S. PATENT DOCUMENTS

| | | | |
|---|---|---|---|
| 2004/0264412 A1* | 12/2004 | Arimitsu | 370/331 |
| 2007/0025306 A1* | 2/2007 | Cox et al. | 370/338 |
| 2008/0235503 A1* | 9/2008 | Akpuokwe et al. | 713/1 |
| 2009/0111463 A1* | 4/2009 | Simms et al. | 455/424 |
| 2009/0215477 A1* | 8/2009 | Lee et al. | 455/466 |
| 2009/0247170 A1* | 10/2009 | Balasubramanian et al. | 455/445 |
| 2010/0020699 A1* | 1/2010 | On | 370/241.1 |
| 2010/0056132 A1* | 3/2010 | Gallagher | 455/422.1 |
| 2010/0111035 A1* | 5/2010 | Eskicioglu et al. | 370/331 |
| 2010/0124931 A1* | 5/2010 | Eskicioglu et al. | 455/440 |

* cited by examiner

*Primary Examiner* — Fred Casca
(74) *Attorney, Agent, or Firm* — Sterne, Kessler, Goldstein & Fox P.L.L.C.

(57) ABSTRACT

Aspects of a method and system for registering femtocells to provide service are provided. In this regard, a communication device may be operable to determine a plurality of femtocells within a vicinity of its location. The communication device may be operable to receive information communicated from one or more of the plurality of femtocells, which are managed by a femtocell management entity. One or more of the plurality of femtocells may be selected for transmitting and/or receiving cellular data based on the communicated information. The communicated information may comprise one or more of global navigation system satellite (GNSS) coordinates, an identification number, potential interference, power levels, location, associated communication devices, and/or directionality of antennas of the one or more femtocells.

19 Claims, 7 Drawing Sheets

| | | Registry | | | | | | |
|---|---|---|---|---|---|---|---|---|
| Sort by: xxxxxxxxxx ▼ (332) | | | | | | | | |
| 336 Name / Description | 338 Femtocell ID | 340 GNSS coordinates | 342 Distance | 344 Antenna Direction | 346 Potential Interference | 348 Power level | 349 Communication devices associated with Femtocell | |
| xxxxxxxxxx | xxxxxxxx | N:dd mm.sss<br>W:dd mm.sss | x.xx meters | xxxxxxxx | xxxxxxxx | xxxxxxxx | xxxxxxxx | 334a |
| xxxxxxxxxx | xxxxxxxx | N:dd mm.sss<br>W:dd mm.sss | x.xx meters | xxxxxxxx | xxxxxxxx | xxxxxxxx | xxxxxxxx | 334b |
| xxxxxxxxxx | xxxxxxxx | N:dd mm.sss<br>W:dd mm.sss | x.xx meters | xxxxxxxx | xxxxxxxx | xxxxxxxx | xxxxxxxx | 334c |

METHOD AND SYSTEM FOR REGISTERING FEMTOCELLS TO PROVIDE SERVICE

CROSS-REFERENCE TO RELATED APPLICATIONS/INCORPORATION BY REFERENCE

Not Applicable

FIELD OF THE INVENTION

Certain embodiments of the invention relate to communications. More specifically, certain embodiments of the invention relate to a method and system for registering femtocells to provide service.

BACKGROUND OF THE INVENTION

A femtocell is a small base station that may be placed in a customer's residence or in a small business environment, for example. Femtocells may be utilized for off-loading macro radio network facilities, improving coverage locally in a cost-effective manner, and/or implementing home-zone services to increase revenue. Femtocells, like macro base stations, may be enabled to connect "standard" phones to a cellular provider's network by a physical broadband connection which may be a digital subscriber line (DSL) connection and/or a cable connection, for example. Since the traffic between a customer's premises femtocell equipment and the operator's network may be traversing a public network, the traffic may be prone to various risks.

Communication between femtocells and one or more cellular provider's networks enables operation in private and public areas. The capacity of a femtocell may be adequate to address a typical family use model supporting two to four simultaneous voice calls and/or data, for example.

An important characteristic of femtocells is their ability to control access. In an open access scenario, any terminal and/or subscriber may be allowed to communicate with the femtocell. Accordingly, the femtocell usage may somewhat resemble that of a macrocellular system. In a closed access scenario, the femtocell may serve a limited number of terminals and/or subscribers that may be subscribed to a given cellular base station. In this regard, the cellular base station may be perceived as being deployed for private usage.

A regulatory issue with regard to femtocells is that they use licensed frequencies that radiate at a very low power in a controlled environment. It may be likely that they may not require a license from a local authority, as macrocellular base stations do. An additional regulatory issue may arise from the relationship between a femtocell operator and a broadband services operator. One possible scenario may include the broadband operator being unaware of the existence of a femtocell operator. Conversely, the broadband operator and femtocell operator may have an agreement or they may be the same operator, for example. Interference between femtocells may be an issue for femtocell deployments based on wideband technologies such as WCDMA, for example, because initial operator deployments may use the same frequency for both the femtocell and the macrocellular networks or due to the proximity of femtocell base stations in dense urban areas There are a plurality of design models for deployment and integration of femtocells, for example, an IP based Iu-b interface, a session initiation protocol (SIP) based approach using an Iu/A interface, use of unlicensed spectrum in a technique known as unlicensed mobile access (UMA) and/or use of IP multimedia subsystem (IMS) voice call continuity (VCC), for example.

In an Iu-b model based femtocell deployment approach, femtocells may be fully integrated into the wireless carrier's network and may be treated like any other remote node in a network. The Iu-b protocol may have a plurality of responsibilities, such as the management of common channels, common resources, and radio links along with configuration management, including cell configuration management, measurement handling and control, time division duplex (TDD) synchronization, and/or error reporting, for example. In Iu-b configurations, mobile devices may access the network and its services via the Node B link, and femtocells may be treated as traditional base stations.

In a SIP based femtocell deployment approach, a SIP client, embedded in the femtocell may be enabled to utilize SIP to communicate with the SIP-enabled mobile switching center (MSC). The MSC may perform the operational translation between the IP SIP network and the traditional mobile network, for example.

In a UMA based femtocell deployment approach, a generic access network (GAN) may offer an alternative way to access GSM and GPRS core network services over broadband. To support this approach, a UMA Network Controller (UNC) and protocols that guarantee secure transport of signaling and user traffic over IP may be utilized. The UNC may be enabled to interface into a core network via existing 3GPP interfaces, for example, to support core network integration of femtocell based services by delivering a standards based, scalable IP interface for mobile core networks.

In an IMS VCC based femtocell deployment approach, VCC may provide for a network design that may extend an IMS network to include cellular coverage and address the handoff process. The IMS VCC may be designed to provide seamless call continuity between cellular networks and any network that supports VoIP, for example. The VCC may also provide for interoperability between GSM, UMTS, and CDMA cellular networks and any IP capable wireless access network, for example. The IMS VCC may also support the use of a single phone number or SIP identity and may offer a broad collection of functional advantages, for example, support for multiple markets and market segments, provisioning of enhanced IMS multimedia services, including greater service personalization and control, seamless handoff between circuit-switched and IMS networks, and/or access to services from any IP device.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for registering femtocells to provide service, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 3B is a diagram illustrating an exemplary registry in a femtocell management entity, in accordance with an embodiment of the invention.

DETAILED DESCRIPTION OF THE INVENTION

Certain embodiments of the invention may be found in a method and system for registering femtocells to provide service. In various embodiments of the invention, a communication device may be operable to determine a plurality of femtocells within a vicinity of its location. The communication device may be operable to receive information communicated from one or more of the plurality of femtocells, which are managed by a femtocell management entity. One or more of the plurality of femtocells may be selected for transmitting and/or receiving cellular data based on the communicated information. The communication device may be operable to determine whether the communication device is enabled to transmit and/or receive cellular data via one or more femtocells based on information communicated to a femtocell management entity from the one or more femtocells. The communication device may be operable to receive from the femtocell management entity, data that indicates whether the communication device is enabled to transmit and/or receive cellular data via one or more femtocells. The femtocell management entity may be operable to update a registry based on the communicated information from the one or more femtocells. The updated registry may comprise one or more of global navigation system satellite (GNSS) coordinates, an identification number, potential interference, power levels, location, associated communication devices, and/or directionality of antennas of the one or more femtocells.

Figure 1A:
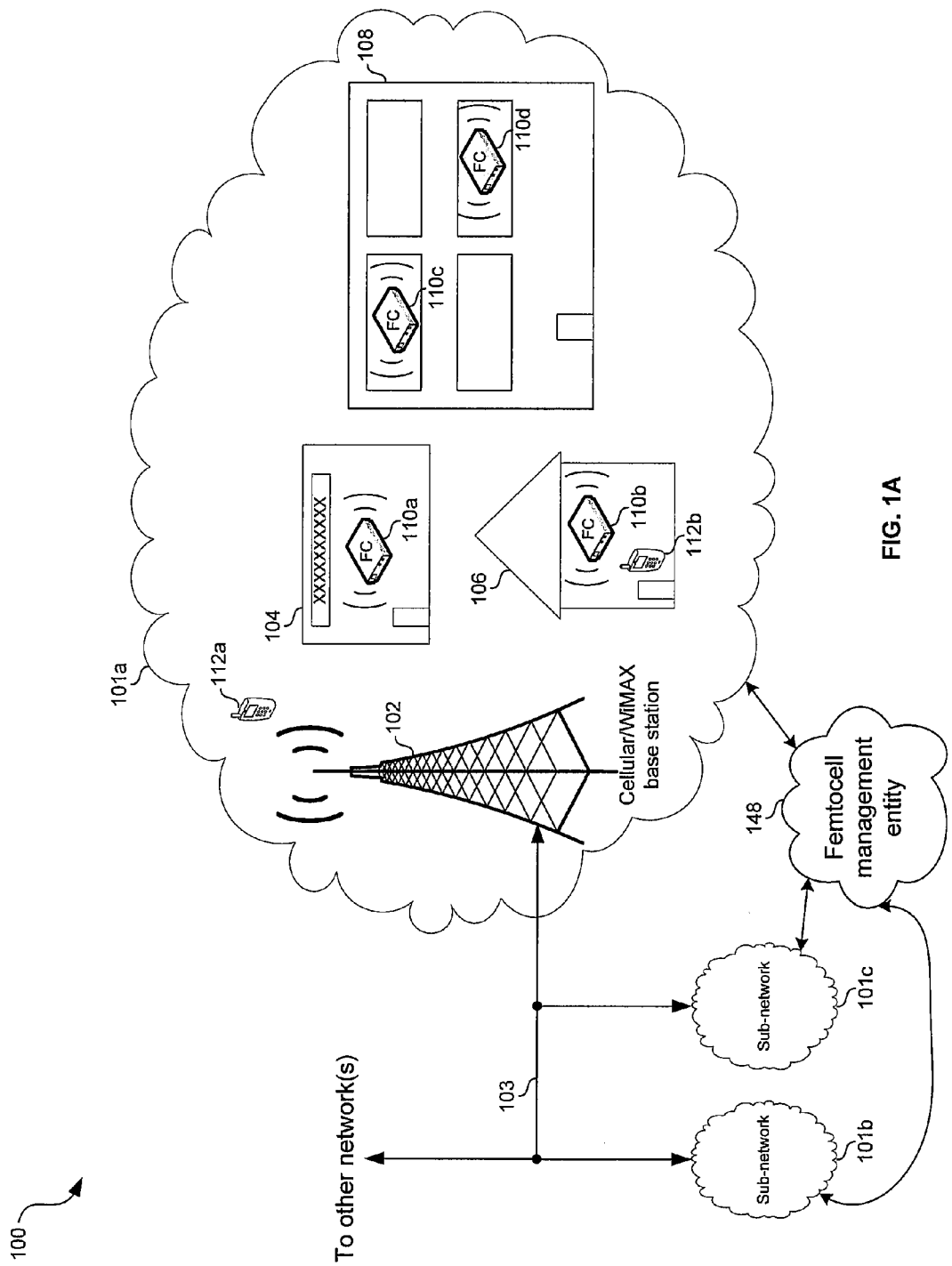
FIG. 1A is a diagram illustrating exemplary registration of femtocells, as part of a cellular network, by a management entity to provide service, in accordance with an embodiment of the invention.

FIG. 1A is a diagram illustrating registration of femtocells, as part of a cellular network, by a management entity to provide service, in accordance with an embodiment of the invention. Referring to FIG. 1A, there is shown a cellular network 100 comprising cellular sub-networks 101a, 101b and 101c, and a femtocell management entity 148. The exemplary cellular sub-network 101a may comprise a base station 102, a plurality of installed femtocells 110a, 110b, 110c and 110d, which are collectively referred to herein as femtocells 110, cellular enabled communication devices 112a and 112b, which are collectively referred to herein as cellular enabled communication devices 112. The femtocells 110 may be installed in one or more commercial properties 104, one or more residential properties 106, and/or one or more multi-tenant properties 108.

The commercial properties 104 may comprise, for example, stores, restaurants, offices, and municipal buildings. The residential properties 106 may comprise, for example, single-family homes, home offices, and/or town-houses. Multi-tenant properties 108 may comprise residential and/or commercial tenants such as apartments, condos, hotels, and/or high rises.

The base station 102 may be operable to communicate data wirelessly utilizing one or more cellular standards such as IS-95, CDMA, GSM, TDMA, GPRS, EDGE, UMTS/WCDMA, TD-SCDMA, HSDPA, WiMAX, extensions thereto, and/or variants thereof. Although a cellular base station is shown, the invention is not so limited. Accordingly, a non-cellular base station such as an IEEE 802.16 WiMAX base station may be utilized without limiting the scope of the invention. "Data," as utilized herein, may refer to any analog and/or digital information including but not limited to voice, Internet data, and/or multimedia content. Multimedia content may comprise audio and/or visual content comprising, video, still images, animated images, and/or textual content. The base station 102 may communicate with cellular enabled communication devices such as the cellular enabled communication devices 112. Exemplary cellular standards supported by the base station 102 may be specified in the International Mobile Telecomunnications-2000 (IMT-2000) standard and/or developed by the $3^{rd}$ generation partnership project (3GPP) and/or the $3^{rd}$ generation partnership project 2 (3GPP2). The base station 102 may communicate data amongst the various components of the sub-network 101a. Additionally, data communicated to and/or from the base station 102 may be communicated to sub-network 101b, sub-network 101c, and/or to one or more other networks (not shown) via one or more backhaul links 103. In this manner, data communicated to and/or from the base station 102 may be communicated to and/or from, other portions of the network 100 and/or other networks. Exemplary networks with which data may be communicated may comprise public switched telephone networks (PSTN) and/or IP networks such as the Internet or an intranet.

The femtocell management entity 148 may comprise suitable logic, circuitry, and/or code for managing operating parameters of one more femtocells 110. The femtocells 110 may each comprise suitable logic, circuitry, and/or code that may be operable to communicate wirelessly utilizing one or more cellular standards such as IS-95, CDMA, GSM, TDMA, GPRS, EDGE, UMTS/WCDMA, TD-SCDMA, HSDPA, WiMAX, extensions thereto, and/or variants thereof. In this regard, the femtocells 110 may each communicate with cellular enabled communication devices such as the cellular enabled communication devices 112. Exemplary cellular standards supported by the femtocells 110 may be specified in the International Mobile Telecomunnications-2000 (IMT-2000) standard and/or developed by the $3^{rd}$ generation partnership project (3GPP) and/or the $3^{rd}$ generation partnership project 2 (3GPP2). Additionally, the femtocells 110 may each comprise suitable logic, circuitry, and/or code that may be operable to communicate over an IP network (not shown in FIG. 1A).

The cellular enabled communication devices 112 may each comprise suitable logic, circuitry, and/or code that may be operable to communicate utilizing one or more cellular standards. In this regard, the cellular enabled communication devices 112 may each be operable to transmit and/or receive data via the cellular network 100. Exemplary cellular enabled communication devices may comprise laptop computers, mobile phones, and personal media players, for example. The cellular enabled communication devices 112 may be enabled to receive, process, and present multimedia content and may additionally be enabled run a network browser or other applications for providing Internet services to a user of the cellular enabled device 112.

The cellular enabled communication devices 112 may gain access to the cellular network 100 and/or to other communication networks via cellular communications with the base station 102 and the femtocells 110. In this regard, in instances that a reliable connection may be established between the base station 102 and a cellular enabled communication device 112, the data may be communicated between the cellular enabled communication device 112 and the base station 102. Alternatively, in instances that a reliable connection may be established between a femtocell 110 and a cellular enabled communication device 112, data may be communicated between the cellular enabled communication device 112 and the femtocell 110.

In this regard, access by a cellular enabled communication device to a femtocell may comprise an ability of the cellular enabled communication device 112 to establish one or more cellular communication channels with the femtocell. The cellular communication channels between the cellular enabled communication device 112 and the femtocell 110 may enable the cellular enabled communication device 112 to exchange data with, for example, other cellular enabled communication devices, landline telephones, and/or network nodes such as fileservers, which may be communicatively coupled to a local area network and/or the Internet. Accordingly, the femtocells 110 may extend the cellular coverage area in the sub-network 101a. In particular, the femtocells 110 may extend or improve cellular coverage indoors or locations out of range of a basestation.

In operation, the femtocell management entity 148 may be operable to receive one or more parameters, for example, potential interference, power levels, location, associated communication devices and/or directionality of antennas from the plurality of femtocells 110a, 110b, 110c and 110d and the plurality of cellular enabled communication devices from each cellular sub-network. The femtocell management entity 148 may also be operable to receive information pertaining to the operational capabilities of the plurality of femtocells 110. The end user device capability may be used to determine how results may be formatted, and/or presented. In an exemplary embodiment of the invention, the femtocell management entity 148 may be operable to receive one or more parameters from the plurality of femtocells 110a, 110b, 110c and 110d and the plurality of cellular enabled communication devices 112a and 112b from the cellular sub-network 101a.

A communication device 112a may be operable to determine whether the communication device 112a is enabled to transmit and/or receive cellular data via one or more femtocells 110a, 110b, 110c and 110d based on information communicated to the femtocell management entity 148 from the one or more femtocells 110a, 110b, 110c and 110d. The communication device 112a may be operable to receive from the femtocell management entity 148, data that indicates whether the communication device 112a is enabled to transmit and/or receive cellular data via the one or more femtocells 110a, 110b, 110c and 110d.

Figure 1B:
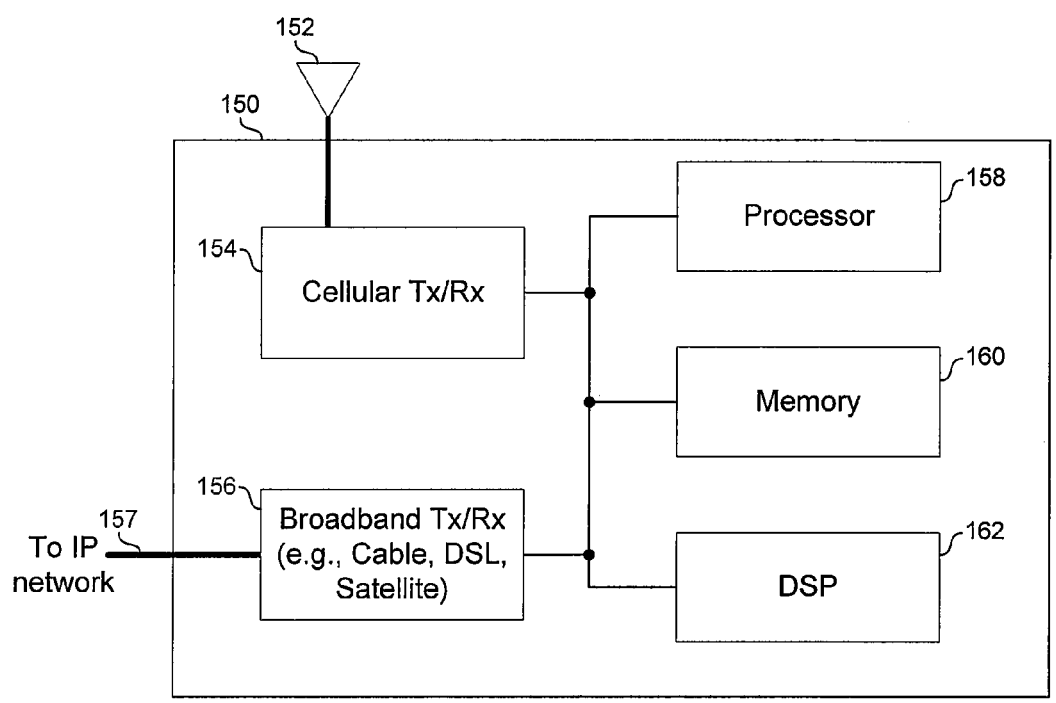
FIG. 1B is a block diagram of an exemplary femtocell, in accordance with an embodiment of the invention.

FIG. 1B is a block diagram of an exemplary femtocell, in accordance with an embodiment of the invention. Referring to FIG. 1B, there is shown a femtocell 150 comprising an antenna 152, a cellular transmitter and/or receiver (Tx/Rx) 154, a broadband transmitter and/or receiver (Tx/Rx) 156, a processor 158, a memory 160, and a digital signal processor (DSP) 162. The femtocell 150 may be similar to or the same as the femtocells 110 described with respect to FIG. 1B. The femtocell 150 may be part of a mesh network of interconnected femtocells.

The antenna 152 may be suitable for transmitting and/or receiving cellular signals. Although a single antenna is illustrated, the invention may not be so limited. In this regard, the cellular Tx/Rx 154 may utilize a common antenna for transmission and reception, or may utilize different antennas for transmission and reception, and/or may utilize a plurality of antennas for transmission and/or reception.

The cellular Tx/Rx 154 may comprise suitable logic circuitry and/or code that may be operable to transmit and/or receive voice and/or data utilizing one or more cellular standards. The cellular Tx/Rx 154 may be operable to perform amplification, down-conversion, filtering, demodulation, and analog to digital conversion of received cellular signals. The cellular Tx/Rx 154 may be operable to perform amplification, up-conversion, filtering, modulation, and digital to analog conversion of transmitted cellular signals. The cellular Tx/Rx 154 may support communication over a plurality of communication channels utilizing time division multiple access (TDMA) and/or code division multiple access (CDMA). Exemplary cellular standards supported by the femtocells 110 may be specified in the International Mobile Telecomunnications-2000 (IMT-2000) standard developed by the $3^{rd}$ generation partnership project (3GPP) and/or the $3^{rd}$ generation partnership project 2 (3GPP2). The cellular Tx/Rx 154 may be operable to transmit and/or receive on one or more frequencies and/or channels. One or more of the frequencies and/or one or more of the channels on which the cellular Tx/Rx 154 receives and/or transmits may be configured via one or more control signals from the processor 158, memory 160, and/or the DSP 162. The cellular Tx/Rx 154 may also comprise a received signal strength indicator for characterizing an environment in which the femtocell 150 resides.

The broadband Tx/Rx 156 may comprise suitable logic, circuitry, and/or code that may be operable to transmit voice and/or data in adherence to one or more broadband standards. The broadband Tx/Rx 156 may be operable to perform amplification, down-conversion, filtering, demodulation, and analog to digital conversion of received signals. The broadband Tx/Rx 156 may be operable to perform amplification, up-conversion, filtering, modulation, and digital to analog conversion of transmitted signals. In various exemplary embodiments of the invention, the broadband Tx/Rx 156 may transmit and/or receive voice and/or data over the link 157 which may be a T1/E1 line, optical fiber, DSL, cable television infrastructure, satellite broadband internet connection, satellite television infrastructure, and/or Ethernet. In various exemplary embodiments of the invention, data received via the broadband Tx/Rx 156 may be conveyed to the processor 158, memory 160, and/or the DSP 162 and may be utilized to control one or more frequencies and/or channels on which the cellular Tx/Rx 154 transmits and/or receives.

The processor 158 may comprise suitable logic, circuitry, and/or code that may enable processing data and/or controlling operations of the femtocell 150. In this regard, the processor 158 may be enabled to provide control signals to the various other blocks comprising the femtocell 150. The processor 158 may also control data transfers between various portions of the femtocell 150. Additionally, the processor 158 may enable execution of applications programs and/or code. In various embodiments of the invention, the applications, programs, and/or code may enable, for example, parsing, transcoding, or otherwise processing data. In various embodiments of the invention, the applications, programs, and/or code may enable, for example, configuring or controlling operation of the cellular Tx/Rx 154, the broadband Tx/Rx 156, the DSP 162, and/or the memory 160. In various embodiments of the invention, the applications, programs, and/or code may enable detecting interference and/or controlling cellular one or more frequencies and/or one or more channels on which the cellular Tx/Rx 154 transmits and/or receives.

The processor 158 may be operable to communicate information to the femtocell management entity 148, such as potential interference, power level, location, associated communication devices, and/or directionality of antennas of the femtocell.

The memory 160 may comprise suitable logic, circuitry, and/or code that may enable storage or programming of information that includes parameters and/or code that may effectuate the operation of the femtocell 150. The parameters may comprise configuration data and the code may comprise operational code such as software and/or firmware, but the information need not be limited in this regard. Moreover, the parameters may include adaptive filter and/or block coefficients. Additionally, the memory 160 may buffer or otherwise store received data and/or data to be transmitted. In various embodiments of the invention, the memory 160 may comprise one or more look-up tables utilized for determining cellular devices within a coverage area of the femtocell 150. In various embodiments of the invention, the memory 160 may comprise one or more look-up tables or other data structures which may comprise information controlling one or more frequencies and/or one or more channels on which the cellular Tx/Rx 154 transmits and/or receives.

The DSP 162 may comprise suitable logic, circuitry, and/or code operable to process audio and/or video signals. In various embodiments of the invention, the DSP 162 may encode, decode, modulate, demodulate, encrypt, and/or decrypt voice and/or data signals. In this regard, the DSP 162 may be operable to perform computationally intensive processing of voice and/or data signals. In various embodiments of the invention, the DSP 162 may be operable to detect interference and/or control one or more frequencies and/or one or more channels on which the cellular Tx/Rx 154 transmits and/or receives. The DSP 162 may be operable to perform, for example, fast Fourier transform analysis (FFT) of received signals to characterize an environment in which the femtocell 150 resides.

The one or more frequencies and/or channels on which the cellular Tx/Rx 154 may transmit and/or receive may also be determined, at least in part, based on data received via the broadband Tx/Rx 156. In this regard, other femtocells and/or base stations may characterize the environment in which they are operating and may communicate results of those characterizations over, for example, an IP network to which the femtocell 150 is communicatively coupled. In various embodiments of the invention, characterizing an environment may comprise measuring one or more parameters, such as measuring signal strengths on one or more frequencies and/or channels to determine potential interference with other installed femtocells, measuring power levels, measuring directionality of antennas and communicating the measured parameters to a femtocell management entity 148 for processing. In this manner, signals which may interfere with cellular communications with the femtocell 150 may be detected.

In operation, information may be exchanged, via the broadband Tx/Rx 156, between the femtocell 150 and a femtocell management entity. The exchanged information may be communicated utilizing, for example, the Internet Protocol (IP). The exchanged information may enable managing access to the femtocell 150 by one or more cellular enabled communication devices. Information may be exchanged between the femtocell 150 and the femtocell management entity via the broadband TxRx 156. The information from the femtocell management entity may be utilized to update one or more tables, lists, databases, registries, or other data structures within the femtocell 150 that may determine permissions and/or track usage and/or billing for cellular enabled communication devices.

In some embodiments of the invention, a cellular enabled communication device may connect to the femtocell management entity via a reserved channel provided by the cellular Tx/Rx 154. In this regard, data destined for the femtocell management entity from a cellular communication device may be received at the cellular Tx/Rx 154 which may down-convert, de-capsulate, and/or otherwise process the data. Additionally, the processor 158, memory 160, and/or DSP 162 may process the data prior to conveying the data to the broadband Tx/Rx 156. The broadband Tx/Rx 156 may then encapsulate, up-convert, and/or otherwise process the data and transmit the data to the femtocell management entity. Similarly, data destined for a cellular communication device from the femtocell management entity may be received at the broadband Tx/Rx 156 which may down-convert, de-capsulate, and/or otherwise process the data. Additionally, the processor 158, memory 160, and/or DSP 162 may process the data prior to conveying the data to the cellular Tx/Rx 154. The cellular Tx/Rx 154 may then encapsulate, up-convert, and/or otherwise process the data and transmit the data to the cellular enabled communication device.

Figure 2:
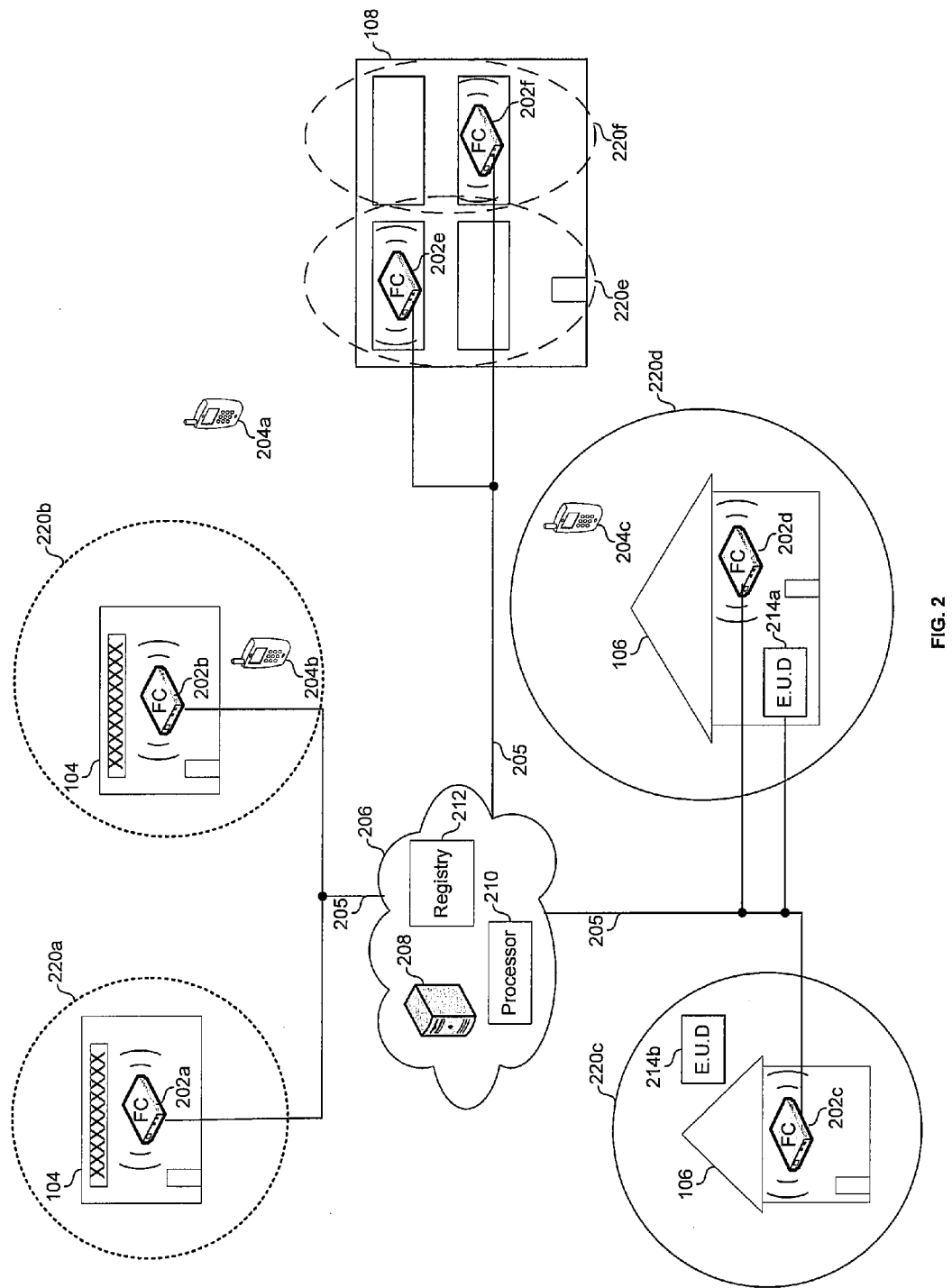
FIG. 2 is a diagram illustrating a geographic area comprising a plurality of femtocells managed via a management entity, in accordance with an embodiment of the invention.

FIG. 2 is a diagram illustrating a geographic area comprising a plurality of femtocells managed via a management entity, in accordance with an embodiment of the invention. Referring to FIG. 2, there is shown a plurality of commercial properties 104, residential properties 106, multi-tenant properties 108, a plurality of femtocells 202*a*, 202*b*, 202*c*, 202*d*, 202*e* and 202*f*, a plurality of cellular enabled communication devices 204*a*, 204*b* and 204*c*, end-user communication devices 214*a* and 214*b*, and a femtocell management entity 206.

The commercial properties 104, the residential properties 106, and the multi-tenant properties 108 may be substantially as described with respect to FIG. 1A. The cellular enabled communication devices 204*a*, 204*b*, and 204*c* may be similar to or the same as the cellular enabled communication devices 112*a* and 112*b* (FIG. 1A). Exemplary cellular enabled communication devices comprise cell phones and laptops with a cellular data card. In some instances, the cellular enabled communication devices 204*a*, 204*b*, and 204*c* may be enabled to communicate with the femtocell management entity 206.

Each of the end-user communication devices 214*a* and 214*b* may comprise one or more of a cellular enabled communication device, similar to or the same as the devices 204*a*, 204*b*, and 204*c*, a wireless communication device such as a Bluetooth and/or Wi-Fi enabled device, and/or a wired communication device such as a computer with an Ethernet port. The end-user communication device 214*a* and 214*b* may be operable to communicate with the femtocell management entity 206.

The plurality of femtocells 202*a*, 202*b*, 202*c*, 202*d*, 202*e* and 202*f*, which are collectively referred to as femtocells 202, may be similar to or the same as the femtocells 110 (FIG. 1A), and/or 150 (FIG. 1B). The femtocells 202 may each be enabled to communicate with the femtocell management entity 206 via, for example, an IP connection.

The plurality of femtocells 202*a*, 202*b*, 202*c*, 202*d*, 202*e* and 202*f* may be established via the femtocell management entity 206. The femtocell management entity 206 may comprise suitable logic, circuitry, and/or code for managing operating parameters of one more installed femtocells 202*a*, 202*c*, 202*d*, 202*e* and 202*f*. In various embodiments of the invention, the femtocell management entity 206 may comprise an application specific device or plurality of devices. Alternatively, the femtocell management entity 206 may reside on and/or be enabled by one or more servers 208, a processor 210 and a registry 212, which may manage various parameters of communication channels over which the femtocells 202 may communicate. For example, the femtocell management entity 206 may comprise one or more web pages, databases, and/or web based applications which may be accessed via an IP network. In determining values for the various parameters, the femtocell management entity 206 may utilize feedback received from the femtocells 202. After determining the parameter values, the femtocell management entity 206 may communicate the determinations to the femtocells 202.

In accordance with an embodiment of the invention, the processor 210 in the femtocell management entity 206 may be operable to receive one or more parameters from one or more femtocells, for example, femtocells 202a, 202b, 202c, 202d, 202e and 202f. The processor 210 may be operable to determine whether the communication device 204a is enabled to transmit and/or receive cellular data via one or more femtocells 202a, 202b, 202c, 202d, 202e and 202f based on the information communicated to the femtocell management entity 206 from the one or more femtocells 202a, 202b, 202c, 202d, 202e and 202f. The communication device 204a may be operable to receive from the femtocell management entity 206, data that indicates whether the communication device 204a is enabled to transmit and/or receive cellular data via one or more femtocells 202a, 202b, 202c, 202d, 202e and 202f.

The processor 210 in the femtocell management entity 206 may be operable to update a registry 212 based on the communicated information from the one or more femtocells 202a, 202b, 202c, 202d, 202e and 202f. The updated registry 212 may comprise one or more of global navigation system satellite (GNSS) coordinates, an identification number, potential interference, power levels, location, associated communication devices, and/or directionality of antennas of the one or more femtocells 202a, 202b, 202c, 202d, 202e and 202f. For example, the registry 212 may comprise the GNSS coordinates 220a of femtocell 202a, GNSS coordinates 220b of femtocell 202b, GNSS coordinates 220c of femtocell 202c, GNSS coordinates 220d of femtocell 202d, GNSS coordinates 220e of femtocell 202e and GNSS coordinates 220f of femtocell 202f.

In accordance with an embodiment of the invention, upon installation and/or powering up of the one or more femtocells 202a, 202b, 202c, 202d, 202e and 202f, the registry 212 may be updated. The registry 212 may be updated upon command from a network administrator or a software program, for example. The communication device 204a may be operable to transmit and/or receive the cellular data based on switching from the one or more femtocells, for example, 202a to one or more other femtocells, for example, 202b in the registry 212 based on the received data from the femtocell management entity 206. The information from communication device 204a may be communicated via a cellular link 205. The cellular link 205 may be operable to communicate the received data wirelessly utilizing one or more standards comprising IS-95, CDMA, GSM, TDMA, GPRS, EDGE, UMTS, WCDMA, WiMAX, TD-SCDMA and/or HSDPA cellular standards.

In various embodiments of the invention, a femtocell may exchange information with the femtocell management entity 206 without intervention from a user, and may automatically update settings or other information stored on the femtocell and/or stored on the servers of the femtocell management entity 206.

Figure 3A:
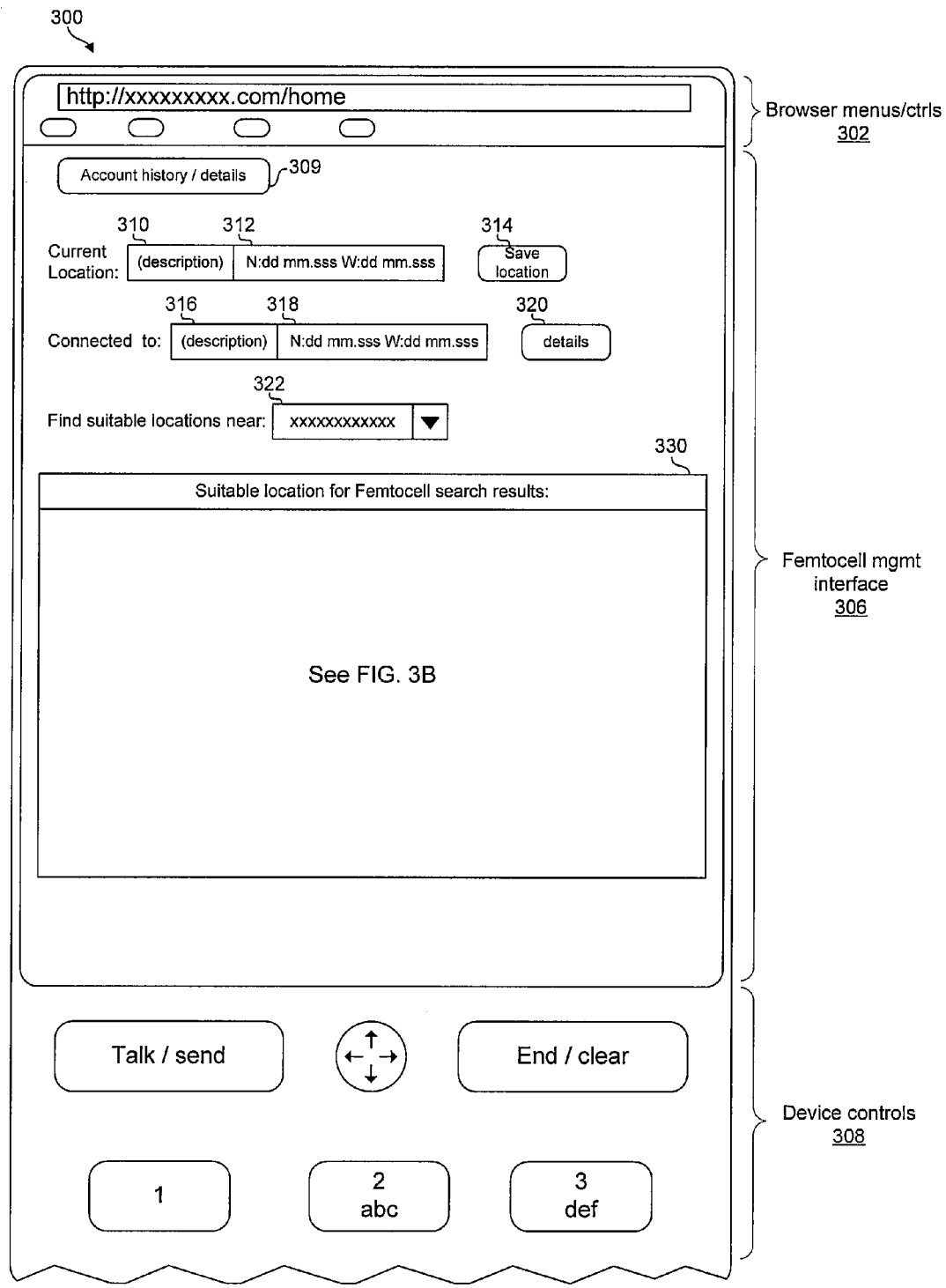
FIG. 3A is a diagram illustrating an exemplary interface for a femtocell management entity as viewed on an end-user communication device, in accordance with an embodiment of the invention.

FIG. 3A is a diagram illustrating an exemplary interface for a femtocell management entity as viewed on an end-user communication device, in accordance with an embodiment of the invention. Referring to FIG. 3A there is shown a portion of an end-user communication device 300 communicatively coupled to a femtocell management entity 206. In the exemplary embodiment of the invention illustrated in FIG. 3A, the end-user communication device 300 may comprise a cellular enabled communication device, a PC, a laptop and/or a wired device, for example. The femtocell management entity 206 may be accessed via, for example, an interface utilizing one or more mark-up languages, such as web browser on the end-user communication device 300. However, the invention may not be so limited and the femtocell management entity 206 may be accessed from an end-user communication device that is not a cellular enabled communication device. In such instances, the femtocell management entity 206 may enable selecting from one or more cellular enabled communication devices and/or femtocells associated with a user's account or profile on the femtocell management entity 206. In this manner, preferences, permissions, and/or locations for a plurality of cellular enabled communication devices and/or femtocells may be managed from a single end-user communication device.

Referring to FIG. 3A, below the browser menus and/or controls 302, the femtocell management entity interface 306 may comprise fields 310, 312, 316, 318 and 322; buttons 309, 314, and 320; and search results window 330. Notwithstanding, the interface illustrated in FIG. 3A is only exemplary and an actual femtocell management entity interface may comprise fewer, different, and/or additional components.

The browser menus and/or controls 302 may be conventional menus and/or controls utilized for actions such as navigating web pages, printing web pages, configuring browser options, and setting user preferences.

In various embodiments of the invention, accessing an account history and/or details button 309 may bring up a web page and/or window that displays past usage for one or more cellular enabled communication devices and/or femtocells. The devices and/or femtocells which are displayed may depend on which devices are associated with a user's account and/or profile stored on the femtocell management entity 206. For example, the end-user communication device 300 may be a cellular enabled communication device and the information displayed may comprise which femtocells the end-user communication device 300 has connected to, how much data the end-user communication device 300 has exchanged with one or more femtocells, how long the end-user 300 has been connected to one or more femtocells, and a current balance of money owed by a user of the end-user communication device 300 in exchange for access to one or more femtocells.

The field 310 may comprise a name or identifier, if any, assigned to the current location of the end-user communication device 300. In this regard, a user of the end-user communication device 300 may, via the field 322, assign an alphanumeric name or other identifier to the GNSS coordinates or a range of GNSS coordinates. Furthermore, the location, femtocell search results for the location, and/or preferences for the location may be saved in local memory on the end-user communication device 300. For example, "home" and "work" may be two commonly saved locations. Accordingly, a user may quickly locate femtocells near saved locations during subsequent visits to the locations, locate femtocells near saved locations when not physically at the locations, and/or find femtocells near the locations when the end-user communication device 300 is unable to access the femtocell management entity 206.

The field 312 may identify the GNSS coordinates of the current location of the end-user communication device 300. In various embodiments of the invention, a range of GNSS coordinates may be associated with a single location. In this regard, a radius preference may be configurable and may determine how large of an area may be considered to be a single location. The radius for each location may be determined, for example, based on the transmit strength of a femtocell.

In an exemplary embodiment of the invention, clicking the button and/or link 314 may display a web page and/or interface that may enable assigning a name to the current location. The current location may be saved to a local memory in the end-user communication device 300 and/or to a profile maintained in the femtocell management entity 206. Additionally, saving locations may enable identifying femtocells near a location even when the user device 300 is not at that location and/or when the user device 300 cannot access the femtocell management entity 206. When saving a location, search results for femtocells near that location and/or user preferences of femtocells near that location may also be saved. An exemplary user preference for a location may comprise which femtocell should be connected to by default when the user device 300 is at that location.

The field 316 may identify a femtocell currently providing cellular service to the user device 300. In instances that cellular access is not available via a femtocell, the field 316 may be blank or grayed out. The field 318 may identify the location of the femtocell providing cellular services to the end-user communication device 300. In instances that cellular access is not available via a femtocell, the field 318 may be blank or grayed out. Alternatively, in instances that the end-user communication device 300 is accessing the femtocell management entity 206 via a femtocell, the field 316 may contain a distinct alphanumeric identifier of the femtocell to which the end-user communication device 300 is connected and the field 316 may comprise the GNSS coordinates of the femtocell.

When one or more cellular communication channels have been established with a femtocell, clicking the button and/or link 320 may display a web page and/or interface that may enable viewing details of the femtocell and/or the cellular connection to the femtocell. For example, the details may provide, where applicable, how long the end-user communication device 300 has been connected, the amount of data exchanged, the IP address of the femtocell, the cellular frequency and/or cellular channel on which the femtocell operates, and details of any service agreement between the cellular enabled communication end-user communication device 300 and the femtocell. The femtocell search results window 330 may provide a list of suitable locations for installation of a new femtocell.

The end-user communication device 300 controls 308 may comprise hard and/or soft buttons to enable user interaction with the end-user communication device 300. Exemplary controls may comprise a touch screen, voice activation, an alphanumeric keypad, a scroll wheel, a roller ball, and/or a multi-directional button.

In operation, a user of the end-user communication device 300 may open a web browser or other interface on the end-user communication device 300 and navigate to the femtocell management entity 206. In an exemplary embodiment of the invention, the user may provide a username and password to authenticate the user and/or the end-user communication device 300 to the femtocell management entity 206. The user may then enter the GNSS address of a femtocell to determine whether a communication device is enabled to transmit and/or receive cellular data via the femtocell. The location may also be determined independent of the user input. For example, the location may be determined via GPS device or AGPS server in instances where the end-user communication device 300 is located on the desired location. The femtocell management entity 206 may be enabled to determine whether the communication device is enabled to transmit and/or receive cellular data via the femtocell based on received parameters, such as potential interference, power levels, location, associated communication devices and/or directionality of antennas from one or more neighboring installed femtocells.

The user may search for femtocells near his current location or in a different location utilizing the field 322. Upon receiving a list of potential femtocells in the search results window 330, the user may sort the results to find a suitable femtocell that best meets the user's necessary and/or desired characteristics. Upon determining a suitable femtocell, the user may transmit and/or receive cellular data from a communication device via the selected femtocell.

FIG. 3B is a diagram illustrating an exemplary registry in a femtocell management entity, in accordance with an embodiment of the invention. Referring to FIG. 3B, the registry 350 comprises a drop-down list 332 and femtocell entries 334a, 334b, and 334c, collectively referred to herein as entries 334. Although only three entries 334 are depicted, the invention may not be so limited and any number of entries may be displayed and/or scrollable in the registry 350. Each entry 334 may comprise a name and/or description field 336, a femtocell identification field 338, a GNSS coordinates field 340, a distance field 342, an antenna direction field 344, a potential interference field 346, a power level field 348, and an associated communication devices field 349.

The name and/or description field 336 may provide information to uniquely describe a femtocell. The femtocell identification field 338 may comprise information such as make, model, and serial number of a femtocell. Additionally or alternatively, the femtocell identification field 338 may comprise an alphanumeric identifier assigned to a femtocell by the femtocell's owner and/or operator. In some embodiments of the invention, the femtocell identification field 338 may comprise a unique key or number similar to or the same as an international mobile subscriber identity (IMSI) utilized by GSM and UMTS cellular networks.

The GNSS coordinates field 340 may indicate the current GNSS coordinates of an installed femtocell. The distance field 342 may indicate a distance of the end-user communication device 300 from a femtocell, for example. The distance field 342 along with the GNSS coordinates field 340 may enable a user of the end-user communication device 300 to locate and move into a coverage area of a femtocell.

The antenna direction field 344 may indicate the current direction of the antenna in the installed femtocell. The potential interference field 346 may indicate the level of potential interference between the plurality of femtocells. The power levels field 348 may indicate the power level of the installed femtocell. The associated communication devices field 349 may indicate the identity of one or more communication devices, for example, 204a and 204b associated with a femtocell, for example, femtocell 202b.

In an exemplary embodiment of the invention, the plurality of parameters in the registry 350 may be dynamically updated based on receiving one or more of the parameters from the plurality of installed femtocells.

The drop-down list 332 may enable sorting the entries 334 by one or more of the fields 336, 338, 340, 342, 344, 346 and 348. For example, a user of the end-user communication device 300 may sort the entries by potential interference field 346 and then by GNSS coordinates field 340 or distance field 342 to find the closest femtocell with the least potential interference. Notwithstanding, a drop-down list is just an exemplary way of sorting the entries 334 for presentation and other embodiments of the invention may sort the entries 334 by, for example, selecting, clicking on and/or activating the various entries or fields.

Figure 4:
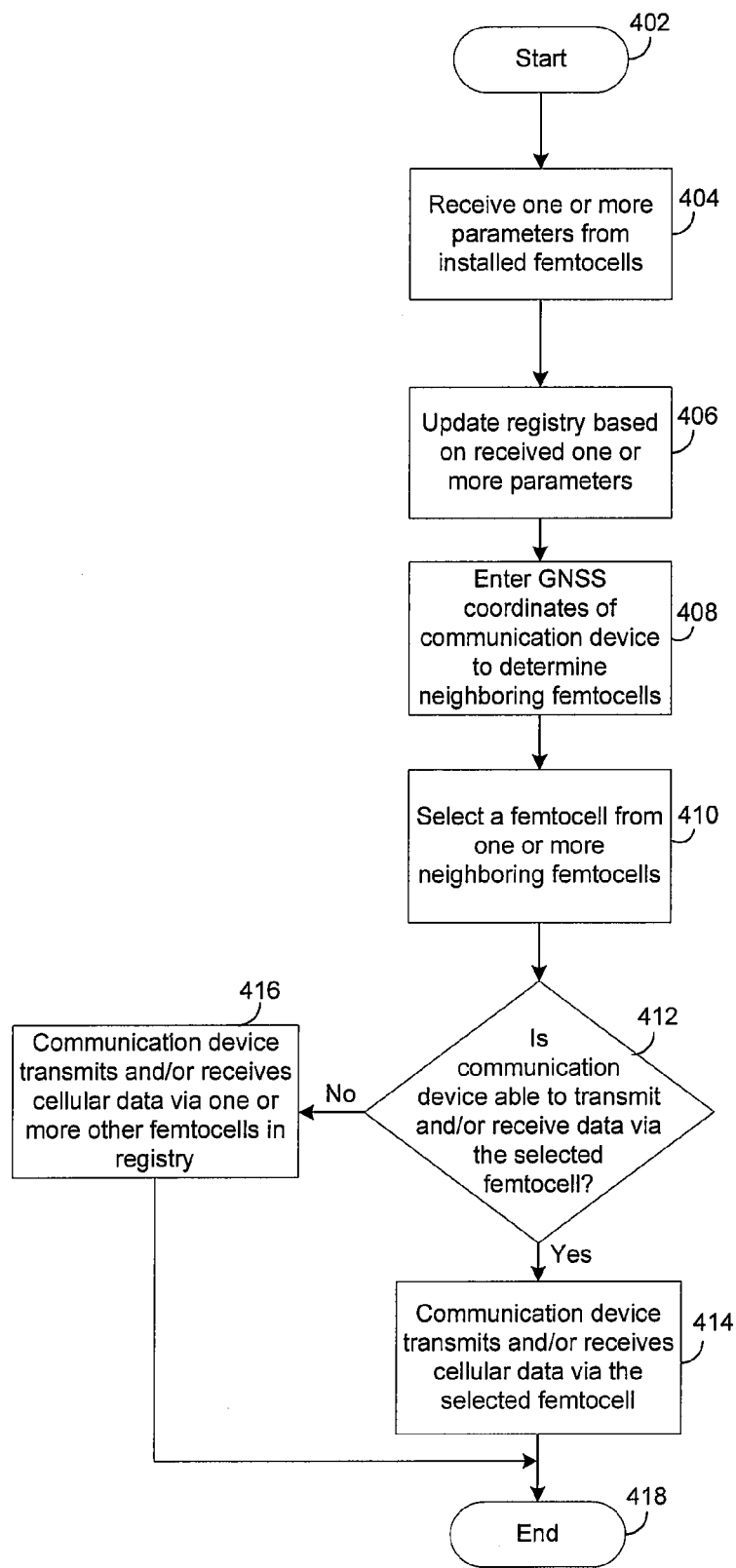
FIG. 4 is a flow chart illustrating exemplary steps for registering femtocells as part of a cellular network to provide service for a user, in accordance with an embodiment of the invention.

FIG. 4 is a flow chart illustrating exemplary steps for registering femtocells as part of a cellular network to provide service for a user, in accordance with an embodiment of the invention. Referring to FIG. 4, exemplary steps may begin at step 402. In step 404, a femtocell management entity may receive one or more parameters, such as potential interference, power levels, location, associated communication devices, and/or directionality of antennas from one or more installed femtocells. In step 406, a registry at the femtocell management entity may be dynamically updated based on the received one or more parameters. In step 408, a user may be enabled to enter GNSS coordinates of a communication device to determine one or more neighboring femtocells. In step 410, the user may select one of the listed femtocells. In step 412, it may be determined whether the communication device is enabled to transmit and/or receive cellular data via the selected femtocell. If the communication device is not enabled to transmit and/or receive cellular data via the selected femtocell, control passes to step 416. In step 416, the communication device may be enabled to transmit and/or receive cellular data via one or more other femtocells listed in the registry. Control then passes to end step 418. If the communication device is enabled to transmit and/or receive cellular data via the selected femtocell, control passes to step 414. In step 414, the communication device may be enabled to transmit and/or receive cellular data via the selected femtocell. Control then passes to end step 418.

Figure 5:
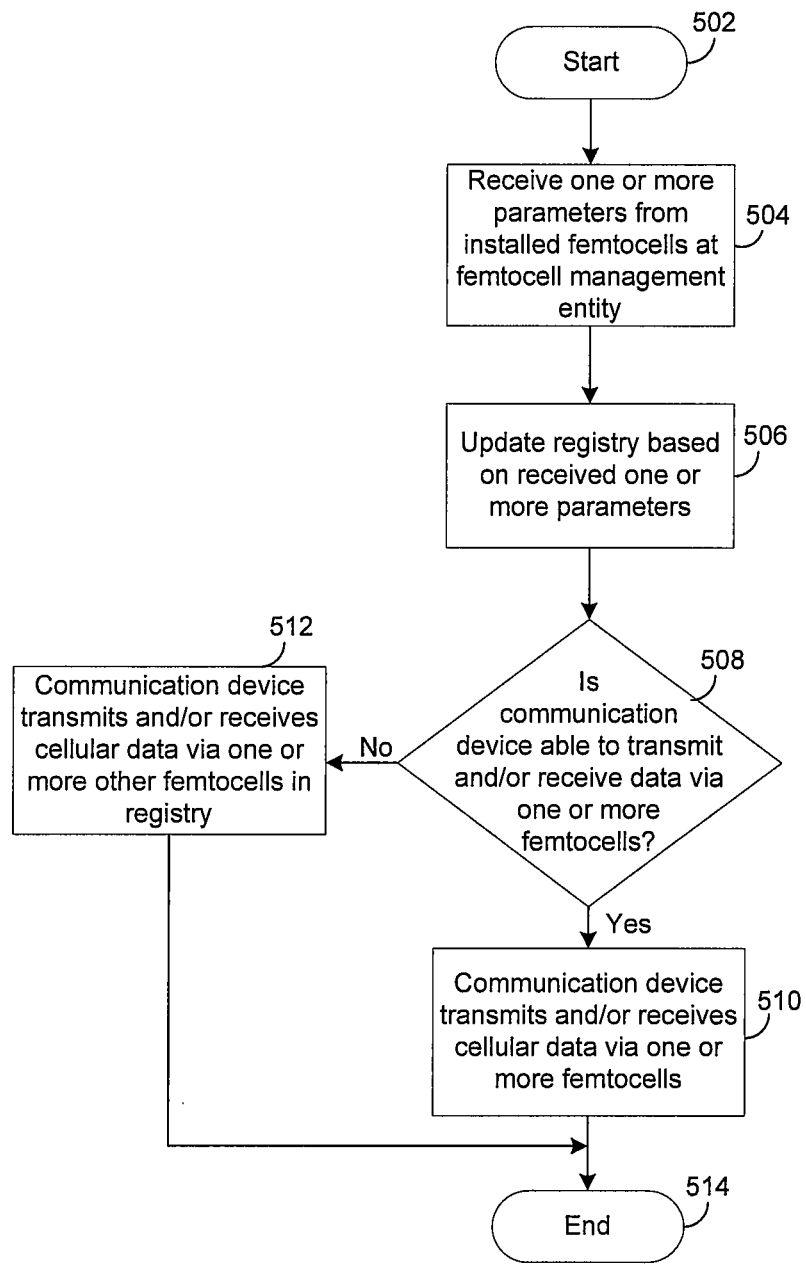
FIG. 5 is a flow chart illustrating exemplary steps for registering femtocells to provide service, in accordance with an embodiment of the invention.

FIG. 5 is a flow chart illustrating exemplary steps for registering femtocells to provide service, in accordance with an embodiment of the invention. Referring to FIG. 5, exemplary steps may begin at step 502. In step 504, a femtocell management entity may receive one or more parameters, such as potential interference, power levels, location, associated communication devices, and/or directionality of antennas from one or more installed femtocells. In step 506, a registry at the femtocell management entity may be dynamically updated based on the received one or more parameters. In step 508, it may be determined whether the communication device is enabled to transmit and/or receive cellular data via one or more femtocells. If the communication device is not enabled to transmit and/or receive cellular data via the one or more femtocells, control passes to step 512. In step 512, the communication device may be enabled to transmit and/or receive cellular data via one or more other femtocells listed in the registry. Control then passes to end step 514. If the communication device is enabled to transmit and/or receive cellular data via the one or more femtocells, control passes to step 510. In step 510, the communication device may be enabled to transmit and/or receive cellular data via the one or more femtocells. Control then passes to end step 510.

In accordance with an embodiment of the invention, a method and system for registering femtocells to provide service may comprise a communication device 204a that may be operable to determine a plurality of femtocells 202a, 202b, 202c and 202d within a vicinity of its location. The communication device 204a may be operable to acquire its location from a global navigation system satellite (GNSS) receiver communicatively coupled to the communication device 204a. The communication device 204a may be operable to receive information communicated from one or more of the plurality of femtocells 202a, 202b, 202c and 202d, which are managed by a femtocell management entity 206. One or more of the plurality of femtocells 202a, 202b, 202c and 202d may be selected for transmitting and/or receiving cellular data based on the communicated information. The communication device 204a may be operable to determine whether the communication device 204a is enabled to transmit and/or receive cellular data via one or more femtocells 202a, 202b, 202c, 202d, 202e and 202f based on information communicated to a femtocell management entity 206 from the one or more femtocells 202a, 202b, 202c, 202d, 202e and 202f. The communication device 204a may comprise a wired and/or wireless communication device. The communication device 204a may be operable to receive from the femtocell management entity 206, data that indicates whether the communication device 204a is enabled to transmit and/or receive cellular data via one or more femtocells 202a, 202b, 202c, 202d, 202e and 202f. The communicated information may comprise one or more of potential interference, power levels, location, associated communication devices, and/or directionality of antennas of the one or more femtocells 202a, 202b, 202c, 202d, 202e and 202f.

The femtocell management entity 206 may be operable to dynamically update a registry 212 based on the communicated information from the one or more femtocells 202a, 202b, 202c, 202d, 202e and 202f. The updated registry 212 may comprise one or more of global navigation system satellite (GNSS) coordinates, an identification number, potential interference, power levels, location, associated communication devices, and/or directionality of antennas of the one or more femtocells 202a, 202b, 202c, 202d, 202e and 202f. The registry 212 may be updated upon installation and/or powering up of the one or more femtocells 202a, 202b, 202c, 202d, 202e and 202f. The registry 212 may be updated upon command from a network administrator. The communication device 204a may be operable to transmit and/or receive the cellular data based on switching from the one or more femtocells, for example, 202a to one or more other femtocells, for example, 202b in the registry 212 based on the received data from the femtocell management entity 206. The communication device 204a may be operable to receive the communicated information via a cellular link 205. The cellular link 205 may be operable to transmit and/or receive cellular data wirelessly utilizing one or more standards comprising IS-95, CDMA, GSM, TDMA, GPRS, EDGE, UMTS, WCDMA, WiMAX, TD-SCDMA and/or HSDPA cellular standards.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for registering femtocells to provide service.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, comprising:
    determining, based on a location of a communication device, a plurality of femtocells within a vicinity of said location;
    receiving, at a femtocell management entity, information comprising a directionality of antenna of at least one of said plurality of femtocells, wherein said at least one femtocell is external to the femtocell management entity;
    sending to the communication device from said femtocell management entity, data that indicates whether said communication device is enabled to transmit and/or receive cellular data via said at least one femtocell and said directionality of antenna of said at least one femtocell, wherein said at least one femtocell is managed by said femtocell management entity;
    dynamically updating, by said femtocell management entity, a registry based on said received information from said at least one femtocell; and
    selecting said at least one femtocell for transmitting and/or receiving said cellular data based on said received directionality of antenna.

2. The method according to claim 1, comprising acquiring said location of said communication device from a global navigation system satellite (GNSS) receiver communicatively coupled to said communication device.

3. The method according to claim 1, further comprising:
    receiving, at said femtocell management entity, information comprising potential interference, power levels, location, and/or associated communication devices of said one or more of said plurality of femtocells.

4. The method according to claim 3, wherein said dynamically updated registry comprises one or more of: global navigation system satellite (GNSS) coordinates, an identification number, said potential interference, said power levels, said location, said associated communication devices, and said directionality of antenna of said at least one femtocell.

5. The method according to claim 1, wherein said registry is updated upon installing and/or powering up of said at least one femtocell.

6. The method according to claim 1, wherein said registry is updated in response to a command from a network administrator.

7. The method according to claim 1, comprising transmitting and/or receiving said cellular data based on switching from said at least one femtocell to another of said plurality of femtocells in said registry.

8. The method according to claim 1, comprising receiving said directionality of antenna via a cellular link.

9. The method according to claim 8, wherein said cellular link transmits and/or receives said cellular data wirelessly utilizing one or more standards comprising: IS-95, CDMA, GSM, TDMA, GPRS, EDGE, UMTS, WCDMA, WiMAX, TD-SCDMA and/or HSDPA cellular standards.

10. A system for network management, comprising:
    a circuit for use in a communication device, said circuit being configured to determine, based on a location of said communication device, a plurality of femtocells within a vicinity of said location;
    a femtocell management entity configured to receive information comprising potential interference, power levels, location, associated communication devices, and a directionality of antenna from at least one of said plurality of femtocells, wherein said circuit is configured to receive from said femtocell management entity data that indicates whether said communication device is enabled to transmit and/or receive cellular data via said at least one femtocell and said directionality of antenna of at least one of said plurality of femtocells, and wherein said at least one femtocell is managed by said femtocell management entity; and
    a registry dynamically updated by said femtocell management entity based on said received information from said at least one femtocell, wherein said circuit is configured to select said at least one femtocell to transmit and/or receive said cellular data based on said received directionality of antenna.

11. The system according to claim 10, wherein said dynamically updated registry comprises;
    global navigation system satellite (GNSS) coordinates, an identification number, said potential interference, said power levels, said location, said associated communication devices, and/or said directionality of antenna of said at least one femtocell.

12. The system according to claim 10, wherein said registry is updated upon installing and/or powering up of said at least one of femtocell.

13. The system according to claim 10, wherein said registry is updated in response to a command from a network administrator.

14. The system according to claim 10, wherein said circuit is configured to transmit and/or receive said cellular data based on switching from said at least one femtocell to another of said plurality of femtocells in said registry.

15. The system according to claim 10, wherein said circuit is configured to receive said directionality of antenna via a cellular link.

16. The system according to claim 15, wherein said cellular link transmits and/or receives said cellular data wirelessly utilizing one or more standards comprising , IS-95, CDMA, GSM, TDMA, CPRS. EDGE, UMTS, WCDMA, WiMAX, TD-SCDMA and/or HSDPA cellular standards.

17. A method for communication, comprising:
    receiving, at a femtocell management entity that is configured to manage a plurality of femtocells, one or more parameters associated with one or more of said plurality of femtocells, said one or more parameters including a directionality of antenna associated with said one or more of said plurality of femtocells;

dynamically updating a registry based on said one or more parameters;

determining, based on a location of a communication device, a femtocell of said plurality of femtocells within a vicinity of said location;

sending, by said femtocell management entity to said communication device, said one or more parameters including the directionality of antenna stored in said registry and data indicative of whether said communication device is enabled to communicate via said determined femtocell of said plurality of femtocells; and selecting said determined femtocell to communicate cellular data with said communication device based on said one or more parameters stored in said registry and said data indicative of whether said communication device is enabled to communicate via said determined femtocell of said plurality of femtocells.

18. The method according to claim 17, wherein said one or more parameters comprise:

an interference value, a power level, a location, or one or more associated communication devices.

19. The method according to claim 17, wherein said one or more parameters comprise:

an interference value, a power level, a location, antenna directionality information, and one or more associated communication devices.

* * * * *

UNITED STATES PATENT AND TRADEMARK OFFICE
CERTIFICATE OF CORRECTION

PATENT NO.         : 9,026,130 B2
APPLICATION NO.    : 12/355064
DATED              : May 5, 2015
INVENTOR(S)        : Kent et al.

Page 1 of 1

It is certified that error appears in the above-identified patent and that said Letters Patent is hereby corrected as shown below:

On the title page, under abstract, 19 Claims, 7 Drawing Sheets, should read
18 Claims, 7 Drawing Sheets.

In the claims

Column 16, line 61, please replace "CPRS" with --GPRS--.

Column 17, lines 24-28, please remove claim 19.

Signed and Sealed this
Twenty-ninth Day of December, 2015

Michelle K. Lee
*Director of the United States Patent and Trademark Office*